W. J. SMITH.
RESILIENT WHEEL.
APPLICATION FILED NOV. 27, 1908.
990,789.
Patented Apr. 25, 1911.
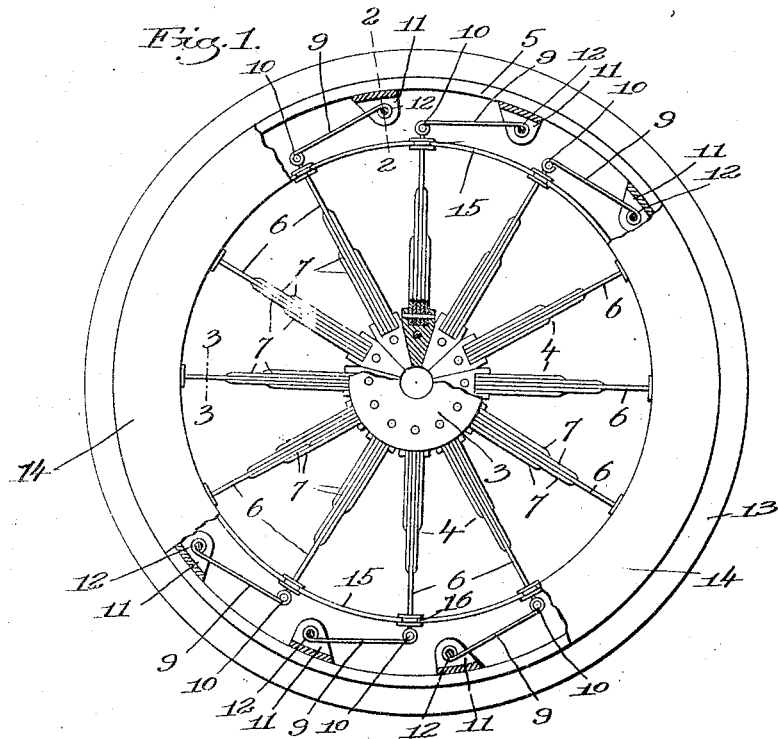
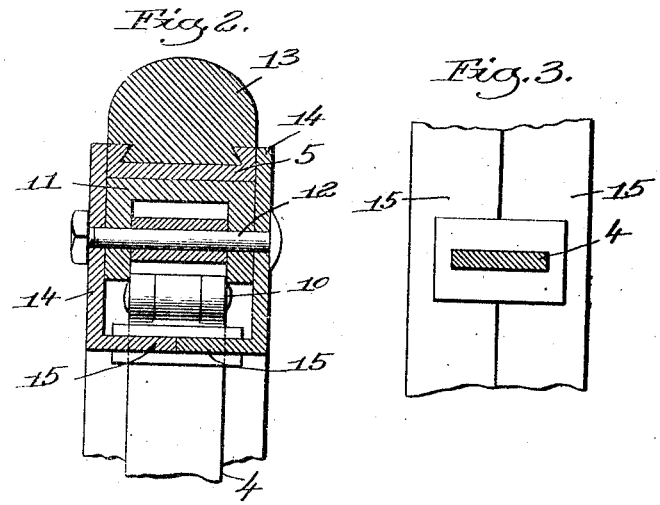
Witnesses:
Fred. S. Greenleaf.
Edward F. Allen.
Inventor.
William J. Smith,
by Crosby & Gregory
Attys.

UNITED STATES PATENT OFFICE.

WILLIAM J. SMITH, OF BOSTON, MASSACHUSETTS, ASSIGNOR OF ONE-HALF TO WILLIAM S. HENNESSY, JR., OF BOSTON, MASSACHUSETTS.

RESILIENT WHEEL.

990,789.   Specification of Letters Patent.   Patented Apr. 25, 1911.

Application filed November 27, 1908. Serial No. 464,631.

*To all whom it may concern:*

Be it known that I, WILLIAM J. SMITH, a citizen of the United States, residing at Boston, county of Suffolk, and State of Massachusetts, have invented an Improvement in Resilient Wheels, of which the following description, in connection with the accompanying drawing, is a specification, like letters on the drawing representing like parts.

This invention has for its object to provide a novel resilient wheel capable of use on carriages, wagons, automobiles, bicycles and other similar vehicles.

In the present invention the spokes are made resilient and the end of each spoke is pivotally connected to the rim of the wheel by a link. The resiliency of the wheel is secured by the resiliency of the spokes.

A structure embodying my invention will first be described and then the novel features thereof will be pointed out in the appended claim.

In the drawings, Figure 1 is a side view of a wheel embodying my invention with a portion of the rim broken out to better show the construction; Fig. 2 is an enlarged section on the line 2—2, Fig. 1; Fig. 3 is an enlarged section on the line 3—3, Fig. 1.

The wheel comprises the hub 3, the spokes 4 and the rim 5. The spokes 4 are straight and are rigidly secured to the hub. Each spoke is made resilient, it preferably being more resilient near the outer end of the spoke than toward the hub. The spokes 4 may be made in any suitable way to secure this result, and I have herein shown each of them as in the form of a leaf-spring which is made up of a central leaf or leaves 6 that extend the full length of the spoke and of progressively shorter outside leaves 7. This manner of making the spokes, however, is not essential to the invention. Each spoke has pivoted thereto at its outer end as at 10 a link 9 which is preferably non-resilient. These links extend tangentially from the ends of the spokes and are pivotally connected to the rim 5. The rim is herein shown as having a plurality of blocks 11 secured thereto to which the links 9 are pivoted as at 12. The rim 5 is preferably of metal and will have a rubber tread surface 13, surrounding the same. Said rim is shown as having secured thereto on each side thereof a flange or side piece 14 which is wide enough to extend over the outer ends of the spokes. Each side piece 14 is formed with an inwardly-directed flange 15 thereby to form an annular compartment in which the links 9 and the ends of the spokes are received. The inwardly-directed flanges 15 are cut away at 16 to form openings for the ends of the spokes. The openings 16 may each be lined with a bushing of rubber or other resilient material if desired.

When weight is applied to the hub of the wheel, said hub will be carried downwardly toward the rim. The spokes directly above and below the hub offer no resistance to such downward movement of the hub and do not in any way support the load, this being so because of the pivotal connection between the spokes and the links. The horizontally-extending spokes, however, do offer resistance to the downward movement of the hub because said spokes are rigidly secured to the hub and the outer ends of the spokes are sustained by the links 9. The load is, therefore, supported entirely by the spokes which have a general horizontal direction, and the resiliency with which the load is supported is secured by the resilient qualities of the spokes as will be evident.

Having described my invention, what I claim as new and desire to secure by Letters Patent is:—

In a resilient wheel, the combination with a hub, of resilient spokes rigidly secured thereto, a rim, a plurality of blocks 11 secured to the inner face of the rim, side pieces 14 overlying the rim and extending inwardly, each side piece having an inwardly-directed flange 15 which engages the spokes, links situated entirely between the side pieces and pivotally connected to the spokes, and bolts extending through the side pieces, blocks and links and operating to pivotally connect the links to the blocks and to secure the side pieces to the rim.

In testimony whereof, I have signed my name to this specification, in the presence of two subscribing witnesses.

WILLIAM J. SMITH.

Witnesses:
 LOUIS C. SMITH,
 FREDERICK S. GREENLEAF.